(12) United States Patent
Stern et al.

(10) Patent No.: US 11,683,290 B1
(45) Date of Patent: Jun. 20, 2023

(54) SYSTEM FOR PRODUCING E-COMMERCE PRODUCT VIDEOS

(71) Applicant: CREATE ADVERTISING GROUP, LLC, Los Angeles, CA (US)

(72) Inventors: David Stern, Los Angeles, CA (US); Jacob William Black, Los Angeles, CA (US); Jonathan M. Gitlin, Los Angeles, CA (US); Michael Gadd, Los Angeles, CA (US); Greg Bolton, Santa Clarita, CA (US); Kyle Dail, Downey, CA (US); Rachael McDonald, Los Angeles, CA (US); Jacob Backer Schwartz, Manhattan Beach, CA (US); Steven Walther, Los Angeles, CA (US)

(73) Assignee: GLOSSI, INC., Los Angeles, CA (US)

( * ) Notice: Subject to any disclaimer, the term of this patent is extended or adjusted under 35 U.S.C. 154(b) by 0 days.

(21) Appl. No.: 17/739,195

(22) Filed: May 9, 2022

Related U.S. Application Data

(63) Continuation of application No. 16/930,273, filed on Jul. 15, 2020, now abandoned.

(51) Int. Cl.
| | | |
|---|---|---|
| H04L 25/02 | (2006.01) | |
| H04L 9/40 | (2022.01) | |
| H04L 25/00 | (2006.01) | |

(52) U.S. Cl.
CPC ........ *H04L 63/0236* (2013.01); *H04L 63/101* (2013.01); *H04L 63/126* (2013.01)

(58) Field of Classification Search
CPC .. H04L 63/0236; H04L 63/101; H04L 63/126
See application file for complete search history.

(56) References Cited

U.S. PATENT DOCUMENTS

| | | | | | |
|---|---|---|---|---|---|
| 5,689,669 | A * | 11/1997 | Lynch | ................... | G06F 3/0481 715/848 |
| 6,002,853 | A * | 12/1999 | de Hond | ............... | G06F 16/954 709/219 |
| 6,243,091 | B1 * | 6/2001 | Berstis | ................ | G06F 3/04815 715/205 |
| 6,271,843 | B1 * | 8/2001 | Lection | ................... | G06T 15/00 715/848 |
| 6,362,817 | B1 * | 3/2002 | Powers | ................... | G06T 17/00 345/428 |
| 6,414,679 | B1 * | 7/2002 | Miodonski | .............. | G06T 13/00 707/999.005 |
| 6,570,563 | B1 * | 5/2003 | Honda | .................. | A63F 13/352 345/473 |

(Continued)

*Primary Examiner* — Nicholas Augustine
(74) *Attorney, Agent, or Firm* — Larry F. Gitlin, Esq.

(57) ABSTRACT

A computer-implemented improved system for producing studio quality e-commerce product videos displaying a 3D rendering created from a 3D model of a product that includes generally the steps of uploading a 3D model of the consumer product onto a computer or an online platform; selecting product features for highlighting in the video; rotating the 3D model to identify selected features; providing text to highlight portions of the video and the selected features; selecting and providing musical accompaniment for the video; and, creating a timeline to establish the sequence of individual portions of the video whereupon the 3D rendered video is then automatically generated for the vendor's e-commerce product page and various social platforms.

13 Claims, 11 Drawing Sheets

(56) References Cited

U.S. PATENT DOCUMENTS

| | | | | |
|---|---|---|---|---|
| 6,573,903 | B2* | 6/2003 | Gantt | G06F 30/00 345/619 |
| 6,590,593 | B1* | 7/2003 | Robertson | G06F 3/04815 715/848 |
| 6,621,508 | B1* | 9/2003 | Shiraishi | G06F 3/0481 715/764 |
| 6,690,393 | B2* | 2/2004 | Heron | G06T 19/00 715/848 |
| 6,961,055 | B2* | 11/2005 | Doak | A63F 13/52 345/677 |
| 7,382,288 | B1* | 6/2008 | Wilson | G08G 5/0021 340/972 |
| 7,414,629 | B2* | 8/2008 | Santodomingo | G06T 17/05 345/582 |
| 7,467,356 | B2* | 12/2008 | Gettman | G06Q 30/02 715/850 |
| 7,653,877 | B2* | 1/2010 | Matsuda | G06F 16/957 463/32 |
| 7,746,343 | B1* | 6/2010 | Charaniya | G06T 17/05 345/428 |
| 8,341,525 | B1* | 12/2012 | Achour | G06Q 10/101 715/201 |
| 2001/0018667 | A1* | 8/2001 | Kim | G06Q 30/0277 705/14.73 |
| 2002/0095463 | A1* | 7/2002 | Matsuda | G06F 16/957 709/204 |
| 2005/0093719 | A1* | 5/2005 | Okamoto | G01C 21/3697 705/14.62 |
| 2005/0128212 | A1* | 6/2005 | Edecker | G06T 17/05 345/581 |
| 2008/0235570 | A1* | 9/2008 | Sawada | G06Q 10/10 356/3 |
| 2019/0108578 | A1* | 4/2019 | Spivack | G09B 5/065 |

* cited by examiner

SYSTEM FOR PRODUCING E-COMMERCE PRODUCT VIDEOS

This application is a continuation-in-part of Prior application Ser. No. 16/930,273 filed on Jul. 15, 2020.

FIELD OF THE INVENTION

The invention comprises an improved system for producing e-commerce product videos. More particularly, the invention enables professionals, and the average small business person absent any special skills or knowledge and without any contributions from a team of specialists and multiple software packages, to create a studio quality video for primarily online use for promoting and explaining a new and/or innovative product.

BACKGROUND OF THE INVENTION

E-commerce product videos for use in marketing and promoting consumer products are not new in the marketplace. Although relatively commonplace, most such videos are definitely the product of a highly sophisticated and skilled professional effort. Professionally produced high quality e-commerce product videos are understandably very expensive to create requiring a team of specialists consisting of, for example, a graphic designer, editor, copywriter and producer supported by multiple software packages. Professionally produced videos are not affordable to most small businesses and start up enterprises. Therefore, attempts by small business or start-up owners to advertise and market a product employing a self-produced e-commerce consumer product video will almost always fall vastly short of achieving the successful result that the business owner would otherwise have hoped for. Producers of studio-quality e-commerce product videos also desire a more efficient and cost-effective system for producing these same types of videos for their own clients.

The improved system has two objectives. The first is aimed at giving businesses studio quality video content across all social channels to fit the vendor's limited budget and achieving this without the contributions of a professional team consisting of, for example, a copywriter, producer, graphic designer, and editor, and multiple software packages. The other objective targets the need of professional vendors giving them the same capabilities as before but with greater efficiency at much less cost.

Thus, until now, and for the reasons stated, nothing in the prior art provides for an improved system utilizing the user's own computer and software, the computer and an off-site server or the computer and the Cloud for the economic and simplified production of sophisticated studio quality e-commerce product videos. Moreover, nothing in the prior art has enabled the professional vendor of studio quality e-commerce product videos to achieve the production of the same high quality product using the simplified and cost effective improved system of the present invention.

SUMMARY OF THE INVENTION

The present invention comprises a computer-implemented improved system for producing studio quality e-commerce product videos displaying a 3D rendering created from a 3D model of a product that includes generally the steps of uploading a 3D model of the consumer product onto a computer or an online platform; selecting product features for highlighting in the video; rotating the 3D model to identify selected features; providing text to highlight portions of the video and the selected features; selecting and providing musical accompaniment for the video; and, creating a timeline to establish the sequence of individual portions of the video whereupon the 3D rendered video is then automatically generated for the vendor's e-commerce product page and various social platforms, as determined.

Accordingly, it is an object of the present invention to provide a computer-implemented improved system for producing a studio-quality e-commerce 3D rendered product video for use in advertising and marketing consumer products.

A further object of the present invention is to provide a computer-implemented improved system for producing a studio-quality e-commerce 3D rendered product video that utilizes a 3D model of the product as its centerpiece.

Another object of the present invention is to provide a computer-implemented improved system for producing a studio-quality e-commerce 3D rendered product video without the need for the individual contributions of a professional copywriter, producer, graphic designer and editor and multiple software packages in the process.

Another object of the present invention is to provide a computer-implemented improved system for producing a studio-quality e-commerce 3D rendered product video more quickly, efficiently and for much less cost.

Still another object of the present invention is to provide a computer-implemented improved system for producing a studio-quality e-commerce 3D rendered product video that are simple to use and affordable to small business owners and start ups.

Other objects and advantages of the present invention in all of its embodiments will become apparent in the following specifications when considered in light of the attached drawings wherein the preferred and alternative embodiments of the present invention may be further illustrated.

DETAILED DESCRIPTION OF THE PREFERRED EMBODIMENT

Figure 1:
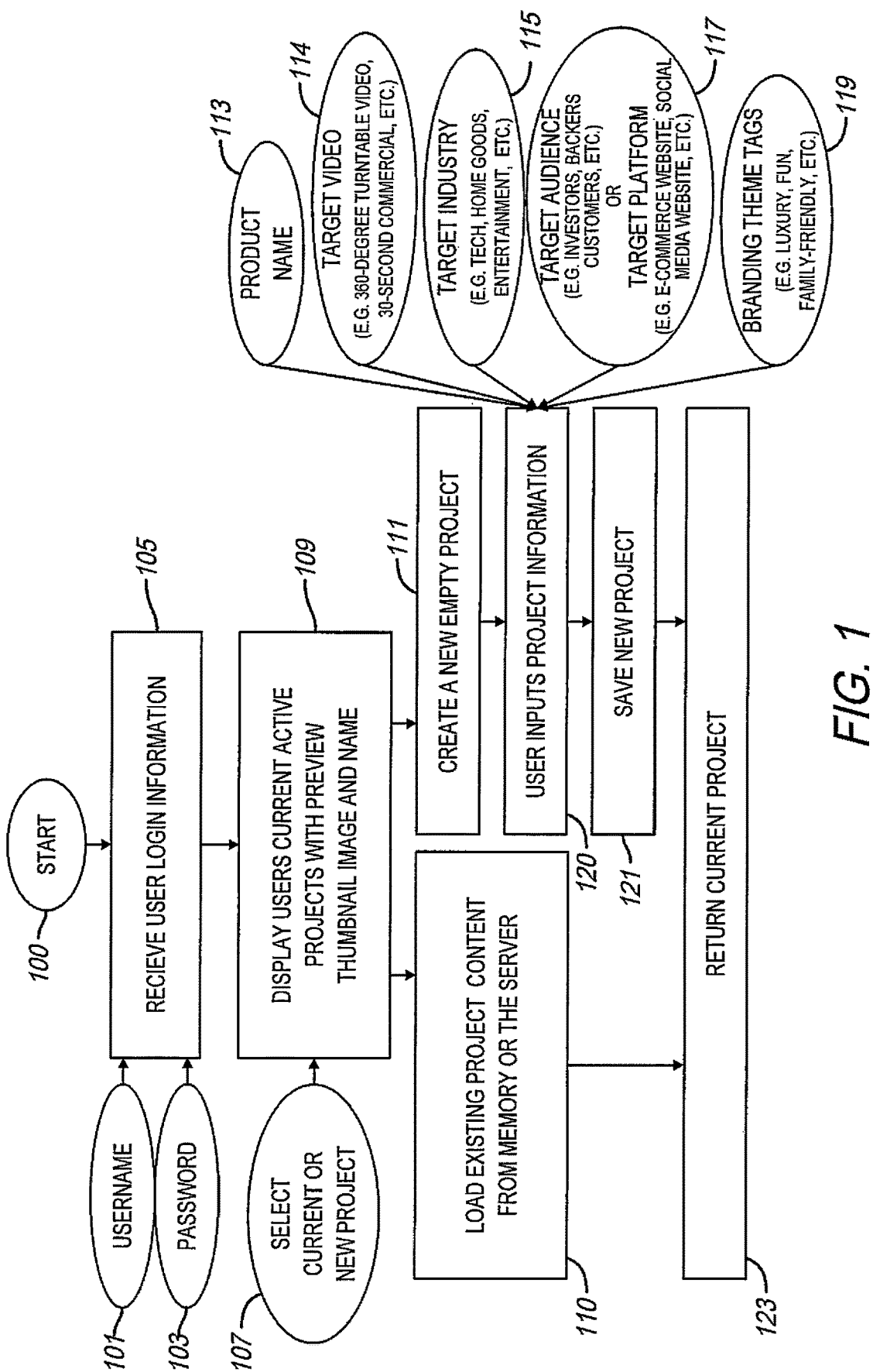
FIG. 1 is a flowchart illustrating a step integral to a computer-implemented improved system for producing studio-quality e-commerce product videos according to the teachings of the present invention.

According to the preferred embodiment of the present invention, a user-controlled computer-implemented system for producing improved e-commerce product videos displaying a 3D rendering of the product created from a 3D model of the product having features and shots and internal and external components comprises the steps of: establishing a connection for the system locally on a computer having the requisite software, between the computer and an offsite server, or between the computer and the Cloud, all of these connections utilizing a web portal accessible by logging in using a personal user name and password; identifying and selecting the 3D model of the product from the group comprised of a concept rendering, technical engineering, thematic and manufacturing drawings, blue-prints, and promotional materials available online or otherwise, and at least one other depicting the 3D model, wherein the concept rendering, drawings, blueprints and promotional materials depict external and internal components of the product; creating a file for a new or updated profile for the 3D model and assigning a name to the 3D model; identifying a target industry for the product from the group comprised of technology, home goods, personal care, fitness, entertainment and at least one other; identifying a target audience for the product from the group comprising investors, distributors, retail customers and at least one other; identifying a branding theme for the product from the group comprised of luxury, exclusive, inexpensive, fun and at least one other; saving the data comprising the 3D model profile and the identified target industry, target audience, and branding theme to the 3D model file on the computer; selecting the 3D model file from among the new or updated 3D model file profiles on the computer; uploading the 3D model file data from the computer to the offsite server or to the Cloud and correspondingly downloading the 3D model file data to the computer, as needed; identifying and saving the product components to the 3D model file on the computer according to shared common materials and geometric and volumetric sizes and shapes wherein the shared common materials and geometric and volumetric sizes and shapes are compared and commonly grouped; identifying internal components of the product using ray traces directing light rays toward the center of the 3D model wherein these components may be identified and eliminated from the 3D model, as the user elects, with the identified eliminated internal components being saved to the 3D model file on the computer; organizing the 3D model by reducing the number of components according to consolidated groupings wherein components may be transferred into a different group, added to a new group or eliminated with the identified transferred, added or eliminated components being saved to the 3D model file on the computer; manipulating the 3D model in real time using a camera to orbit the 3D model and relative to the 3D model to zoom in and out for locating key feature points and associating the components with definitions specific to the features, with the key location points and defined component features being saved to the 3D model file on the computer; providing information regarding the features, including name identifier and onscreen text displaying facts explaining how individual components appear, function and interrelate, with the provided information being saved to the 3D model file on the computer; providing a catalog of music with music selections associated with the same key words or terms that identify the branding theme, target audience and target industry, and selecting the music that will conform to the estimated duration and pacing of the 3D product video along a timeline with the associated music selections and the selected conformable music being saved to the 3D model file on the computer; displaying several tabs comprising the content of the timeline, with each tab representing a feature or shot of the 3D product, and each shot individually generated based on the position of key features of the 3D model, with each display tab representative of a corresponding feature and shot being saved to the 3D model file on the computer; creating a 3D video rendering from the 3D model of the product according to the system of steps of the present invention; and, delivering the 3D video rendering as downloads or embeddable links.

With greater particularity, to start 100 the process, as shown in the flowchart in FIG. 1, the user must establish a connection for the system either locally on the user's own computer having the requisite software or via an offsite server or the Cloud through a web portal employing a personal username 101 and password 103 to login 105. Once logged in, the user can load existing product content from memory or the server 110 or to create a new product profile, create a new project or update an existing one 107, which may be identified by a thumbnail image and name to enable easy access 109. Establishing a new product profile 111 involves naming the product 113 and then, as the user may elect, identifying the target industry 115, e.g. home goods, personal care, fitness, technology, entertainment, etc., and a target audience 117, e.g. investors, customers, etc. To help identify an appropriate theme or tone for the product, choices are available from among specific tags 119, e.g. luxury, exclusive, inexpensive, easy, fun, etc. The project information is uploaded 120 and the data is saved 121. The user may then later return to the current project 123.

An example of a product profile for which the present invention may be employed is a smartphone product, which shall be named "myPHONE", and the user will create by first selecting the target industry (for example, "technology") followed by a subcategory, such as "mobile devices." Since this product targets high end consumers, the target audience would be "customers", and for the desired brand message, the user may then select among various tags, including, for example, "exclusive", "premium" and "luxury".

Figure 2A:
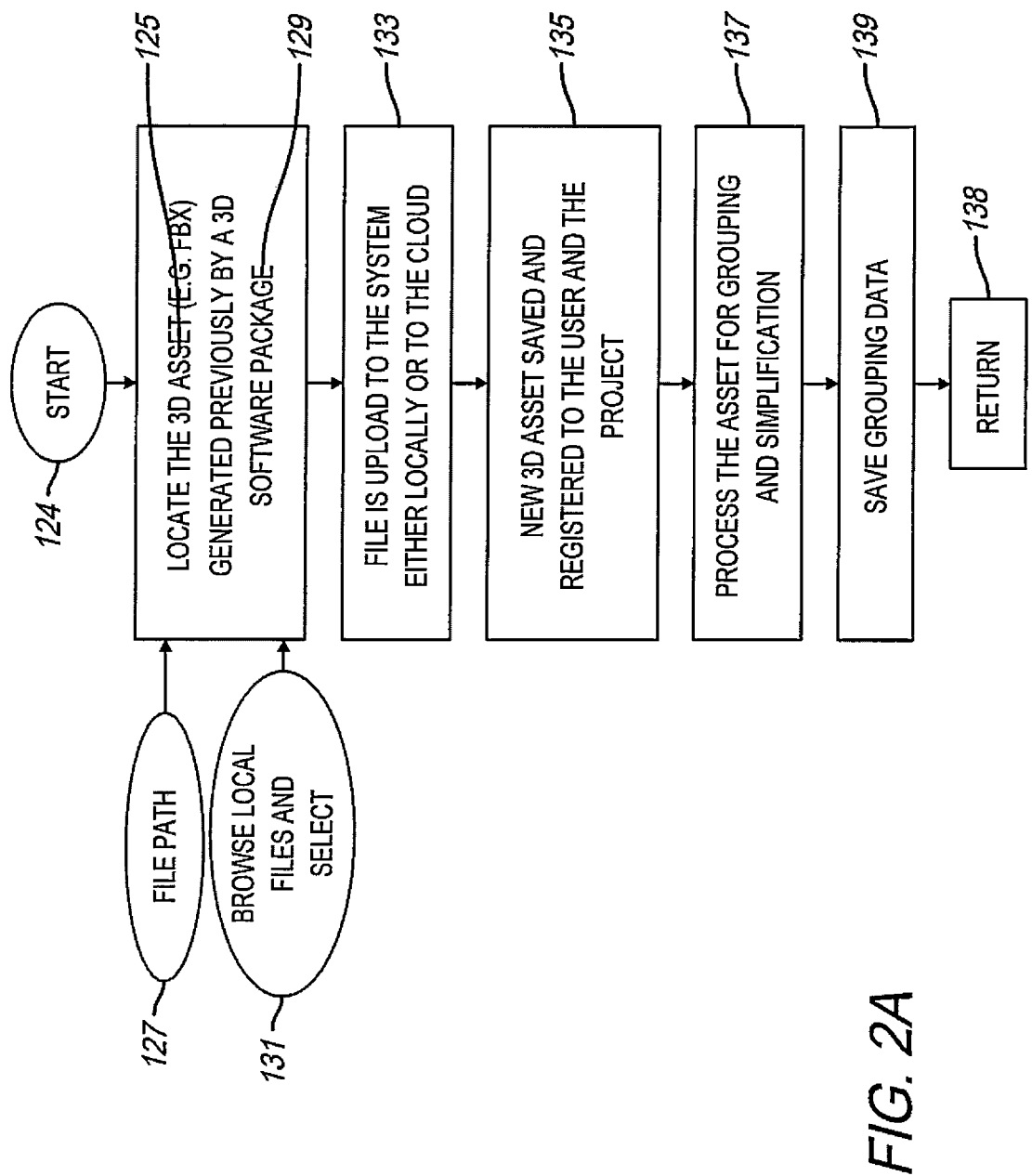
FIG. 2a is a flowchart illustrating a step integral to a computer-implemented improved system for producing studio-quality e-commerce product videos according to the teachings of the present invention.

Step 2 in the process, as shown in the flowchart in FIG. 2a, starts 124 by using the appropriate file path 127 to locate an existing 3D model of the product (also known as a 3D asset) 125 generated from a source (e.g. software package 129) consisting of, for example, a concept rendering, technical engineering, manufacturing and schematic drawings, blueprints or promotional materials depicting the model.

The 3D asset or product file is saved 135 in a proprietary film format (e.g. .fbx), which is used to provide interoperability between digital content creation applications. In the present scenario, to upload the 3D asset file, the user first clicks a button labeled "Upload a New Model", which produces a pop up window to permit the user to browse the local computer files 131. A 3D asset file is then selected for use in the processing of the product profile and then either uploaded locally to the user's own computer software or uploaded to an offsite hosted server or the Cloud 133. A progress tracking bar is displayed and can be observed by the user as the 3D model is uploaded and processed. The system of the present invention analyzes the 3D model of the product to best identify the various components of the product that are made from the same materials and to further identify the components that can be grouped 137 into single pieces, all of which are then saved 139. An example relative to the 3D model of the myPHONE in the instant case are symmetrical pieces comprising the metal bezel framing the screen, which typically share a common material, i.e. metal and, thus, may be grouped together. The user may then return 138 to any step in the sequence of data entries in the system.

Figure 2B:
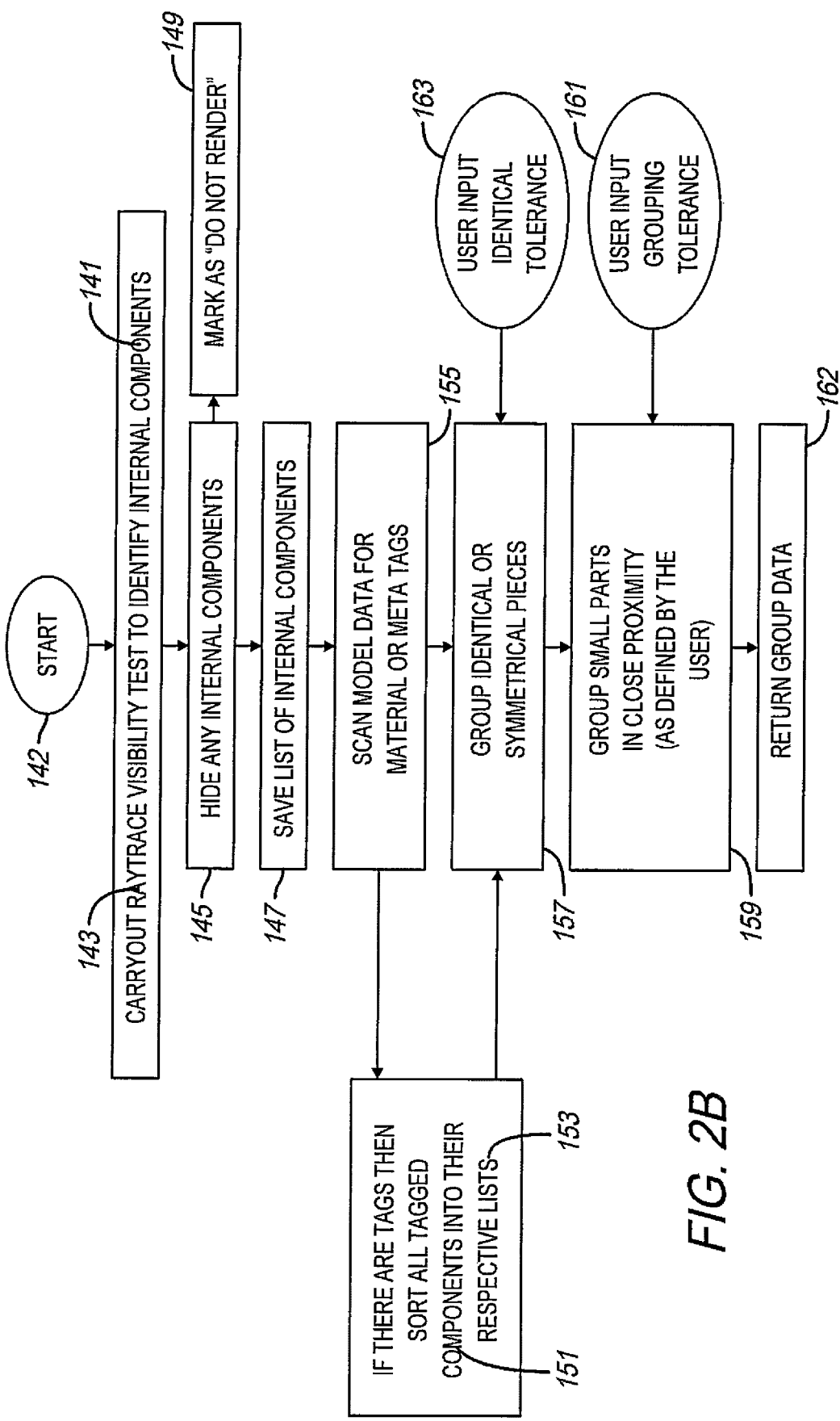
FIG. 2b is a flowchart illustrating a step integral to a computer-implemented improved system for producing studio-quality e-commerce product videos according to the teachings of the present invention.

Another aspect of the system of the present invention, as shown in FIG. 2b, starts 142 with the identification and exclusion of certain internal components 141 of the product. This is accomplished by simulating many light rays, also known as ray traces 143, that are emitted from points around the model and directed inwards toward the model's center. Model components are thus identified and located and parts that are determined to be completely occluded may be eliminated or hidden 145 from the model renderings and marked 149. A list of internal components is then saved 147. In the "myPHONE" example, since the speakers and vibration units in the engineered model are internal and, thus, hidden from view, they may be removed from the rendering. Internal components may be eliminated from the system entirely or grouped together and held in the system to be accessed and visually revealed at another time, as the user may elect.

For product models that include tags, the tags may be used as key words to group component pieces having the same common feature or material 151. Components comprised of the same material, for example metal or plastic, can be grouped according to that material. The system essentially reads through existing tags in the model data and creates a list for each unique tag 153, then adds to that list all other components sharing the same tag. Where no preset tags are assigned, the system of the present invention scans all components for common geometric and/or volumetric sizes and shapes and material compositions and then compares each in order to group identical 163 components accordingly 155, 157. If the system finds any identical pieces it defaults to operating under the assumption that these identical pieces are made of the same material and should look visually the same. Finally, the system identifies small group pieces 159. To do this, the volumetrically sorted list of pieces is used and proximity tests are run to measure the number of similarly sized parts within a set distance. This set distance is abstracted to the user but enables the user to make modifications to the "Grouping Tolerance" 161, which will determine how aggressively the system will attempt to group these small pieces. The user may then click on the return button to access group data information 162, as elected.

Figure 3:
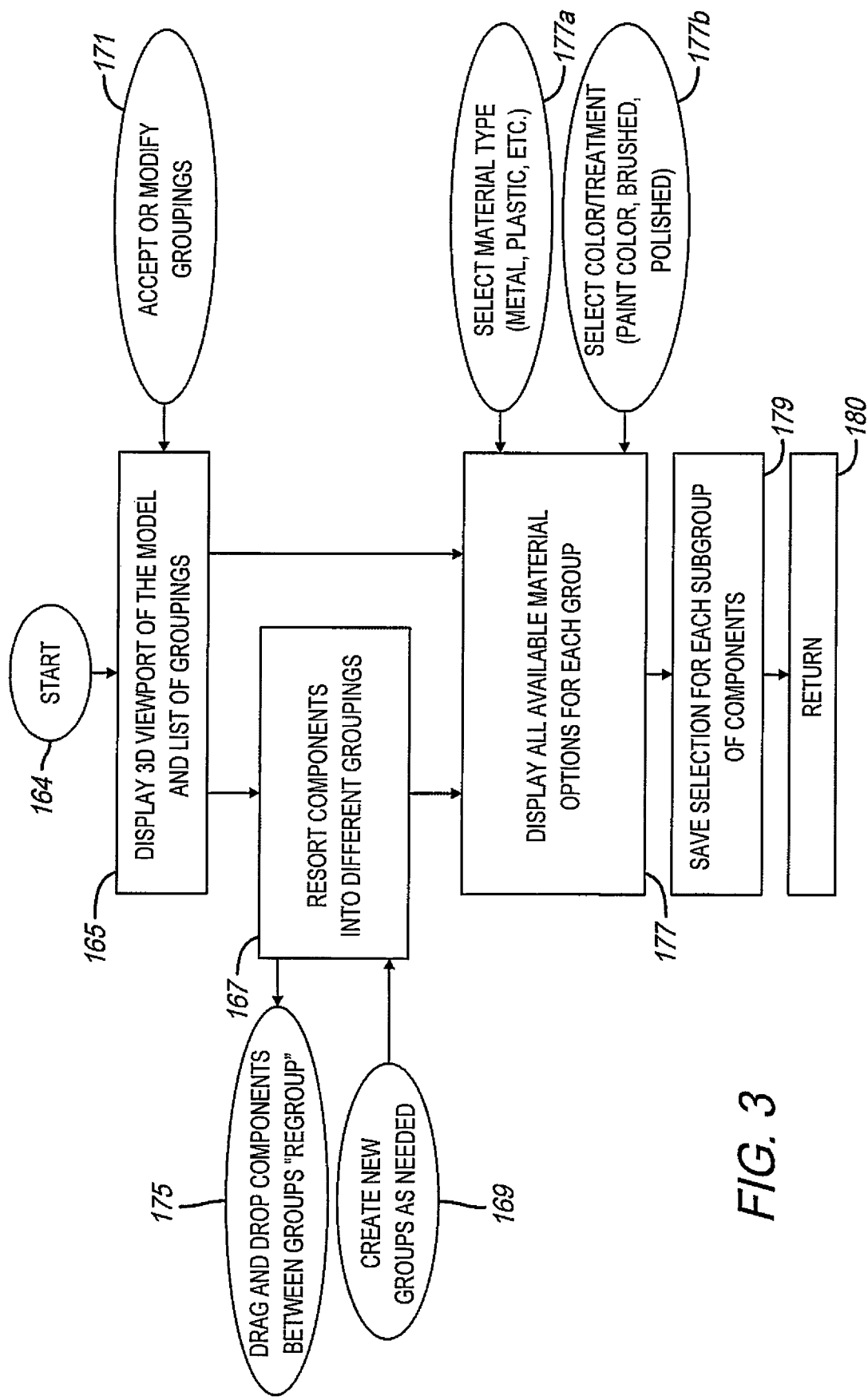
FIG. 3 is a flowchart illustrating a step integral to a computer-implemented improved system for producing studio-quality e-commerce product videos according to the teachings of the present invention.

Step 3 in the process, as shown in the flowchart in FIG. 3, starts 164 after the system has completed its analysis of the product model whereupon the user is presented with a 3D viewer window (view port) that displays the 3D model selected along with a list of the groupings 165 (e.g. components comprised of the same material) and simplifications (e.g. components grouped into single pieces or elimination of internal components) that the system has determined to be most optimal. Optimization of the model results in a more efficient system effectively reducing the amount of components that need to be selected from possibly many thousands to relatively few according to their consolidated groupings. At this stage, components can be transferred into different groups 167, eliminated altogether or included within a new grouping 169. The system may also be revised to affect the automatic interpretation of the product model. Again, incorrect groupings can be corrected 171, misidentification of components can be resolved and components can be properly color coded if they were previously not coded correctly.

All of the above steps can be accomplished simply by clicking on the item on the 3D model viewer window or by selecting among a series of drop down lists containing individual components in a grouping. An incorrectly grouped component can either be moved into another established group by clicking the button designated "Regroup" 175 or may be made the first element of a new group by clicking the button designated "Create a New Group" 169. In the "myPHONE" example, if the system misidentified the volume switch on the side of the "myPHONE" as being effectively part of the aluminum casing of the phone and, therefore, color-coded the same as the body of the "myPHONE", the user would have this opportunity to correct the grouping and clarify that the volume button is a unique and independent piece and should be kept separate and most likely made of a material other than that of the casing.

After the completion of the arrangement, designations or revisions of the various groupings or their component parts according to size and shape, for example, the user is presented with a variety of materials and colors from which to select for the components 177, 177a, 177b. This is achieved by employing a pop up window containing a drop down list of various materials, e.g. metal or plastic, after which the user is presented with color options to enable the customization of colors for all the various components. All selections, changes, etc. are then saved 179 at one time or may be saved when they occur at any other point during the process. The button 180 enables the user to return to any step in the system the user chooses.

Figure 4:
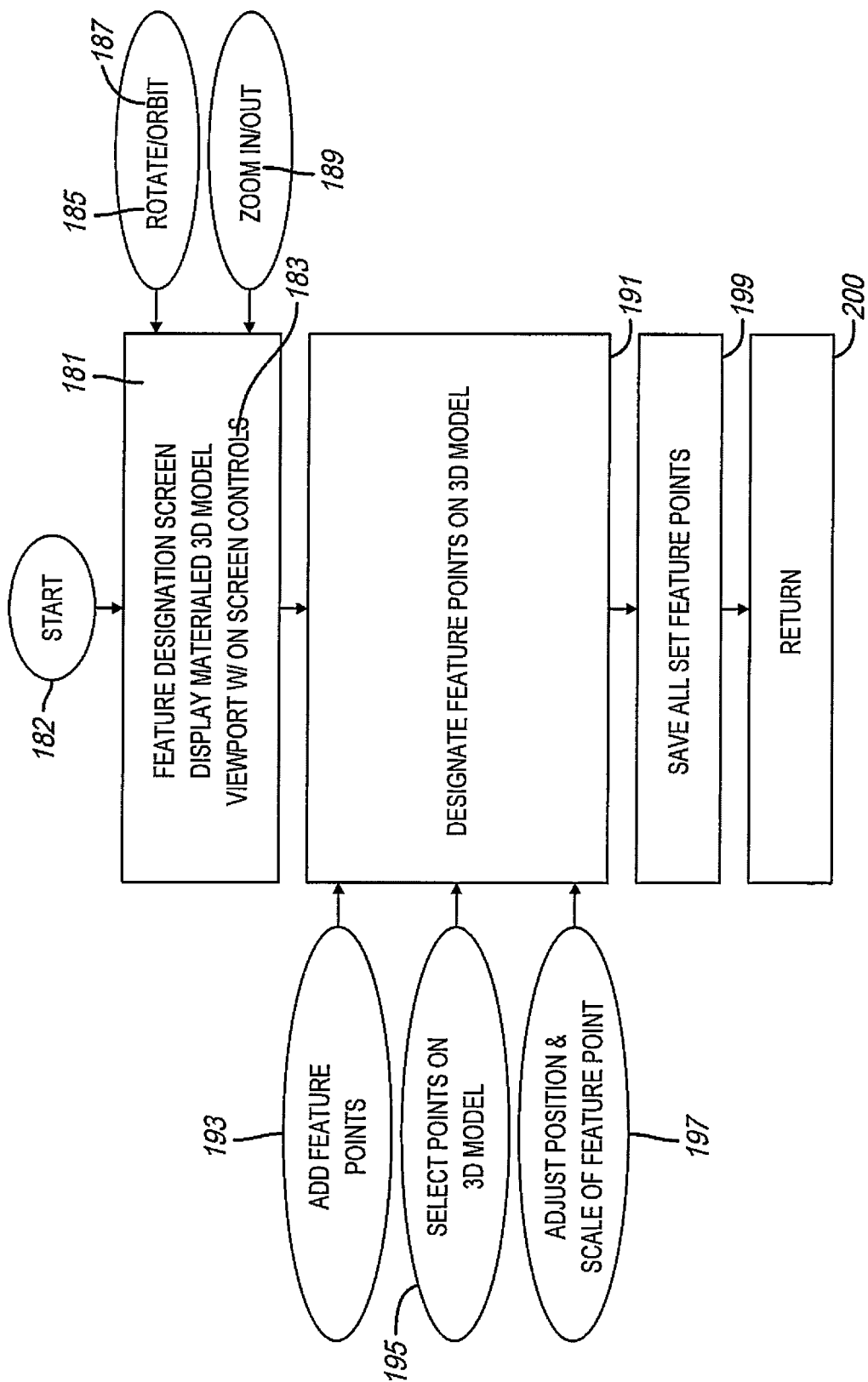
FIG. 4 is a flowchart illustrating a step integral to a computer-implemented improved system for producing studio-quality e-commerce product videos according to the teachings of the present invention.

Arriving at the next step in the process, as shown in the flowchart in FIG. 4, the user starts 182 with the system having a complete visual representation of the product and an approximate understanding of the component make up of the product 3D model, including material composition, and how these components appear, function and interrelate, as further described below. Thus, the user is presented with the Feature Designation Screen 181 which depicts a 3D preview of the 3D product model and several onscreen controls 183, including rotation controls 185 allowing the camera to orbit the product 187 and zoom-in and zoom-out control buttons 189. The onscreen controls also include input controls which, when operated by right-clicking the mouse, for example, enable the user to drag the product from side to side or to rotate it. A mouse wheel can also be scrolled up or down to zoom in on or out from the product.

The input controls enable the user to manipulate the 3D model in real time and locate its key feature points, which can be revised at any time, but initially serve to associate a set of physical components or region of the 3D model with feature designations 191. From an operational perspective, the user clicks the "Add Feature Point" button 193 and then clicks the 3D model part the user elects to associate with that feature. Placing the cursor over the feature point reveals controls that allow the repositioning and/or resizing of the feature point selected 195, 197.

After this step in the sequence, the feature points are saved 199. In the "myPHONE" product example, the user would typically select key features, including, for example, the screen, the speaker, the back piece of the body casing, and the camera. The user may then return 200 to any step in the sequence the user elects.

Figure 5:
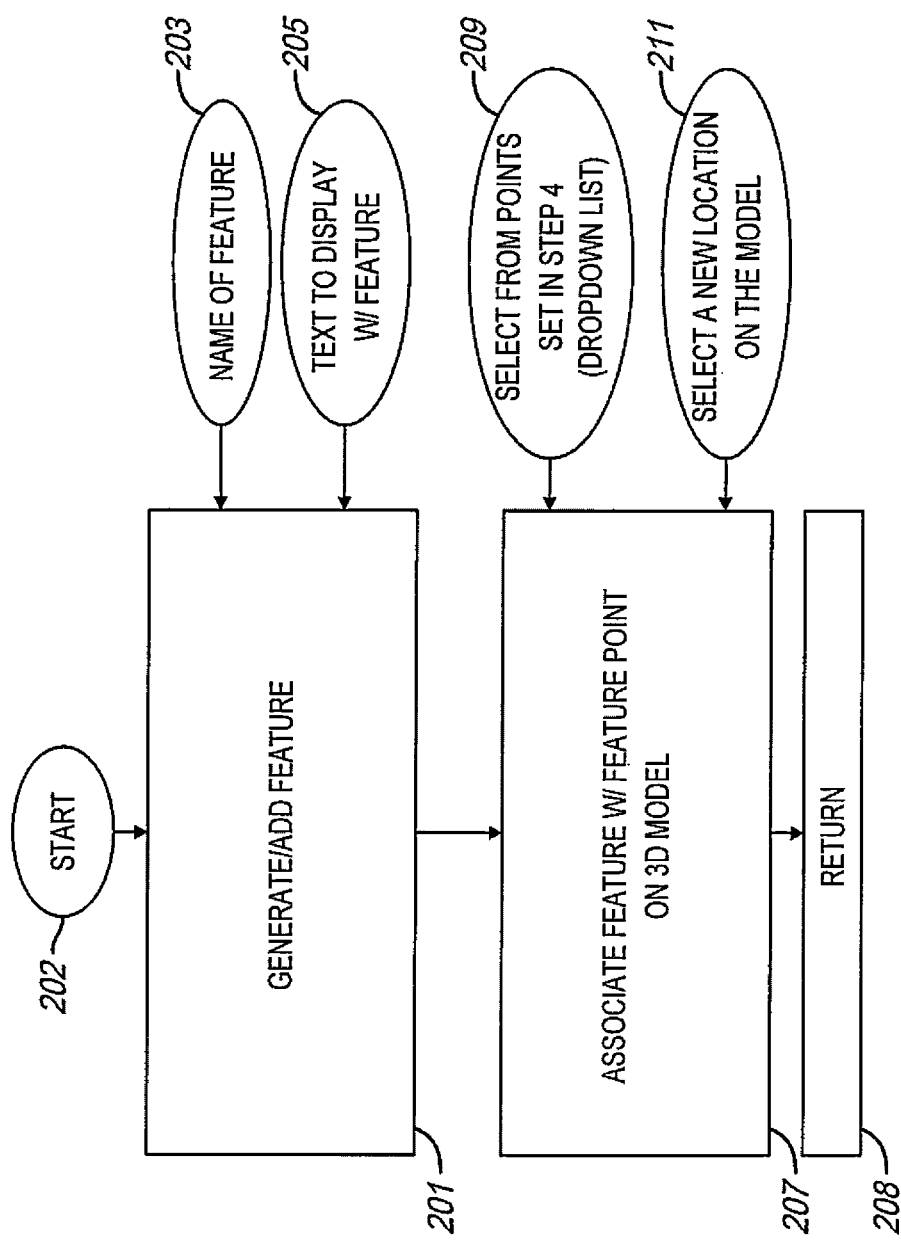
FIG. 5 is a flowchart illustrating a step integral to a computer-implemented improved system for producing studio-quality e-commerce product videos according to the teachings of the present invention.

As depicted in the flowchart in FIG. 5, the user starts 202 by incorporating each feature into the system and then highlights or explains each feature with the use of appropriate information for this purpose. This part of the process starts by clicking the "Creation/Add Feature" button 201 which brings up the feature creation tab for the new or added generated feature. The user may then provide information about the feature, including, for example, the identifier or name 203 of the feature and any onscreen text 205, including without limitation, facts regarding how individual components appear, function and interrelate relative to the feature the user wishes to display. In this way, any of the product feature points on the 3D model already selected from the points on the drop down list 209 can be associated with a particular feature or location now or existing 211. In doing so, the system automatically knows to associate the feature with a particular feature point on the 3D model 207 and to reveal the selected information associated with the feature. Using the "myPHONE" product example, one of the features is the high-resolution camera. The user inputs the name "Camera Feature" and then the text (or copy) "Featuring a New Ultra High-Resolution Camera" is shown alongside the feature. The camera location is then selected from the list of feature points that were designated in the previous step or an entirely new feature of the model can be selected to focus on creating a new Feature Point in the process. Clicking on the return button 208 returns the user to any step in the sequence the user elects.

Figure 6A:
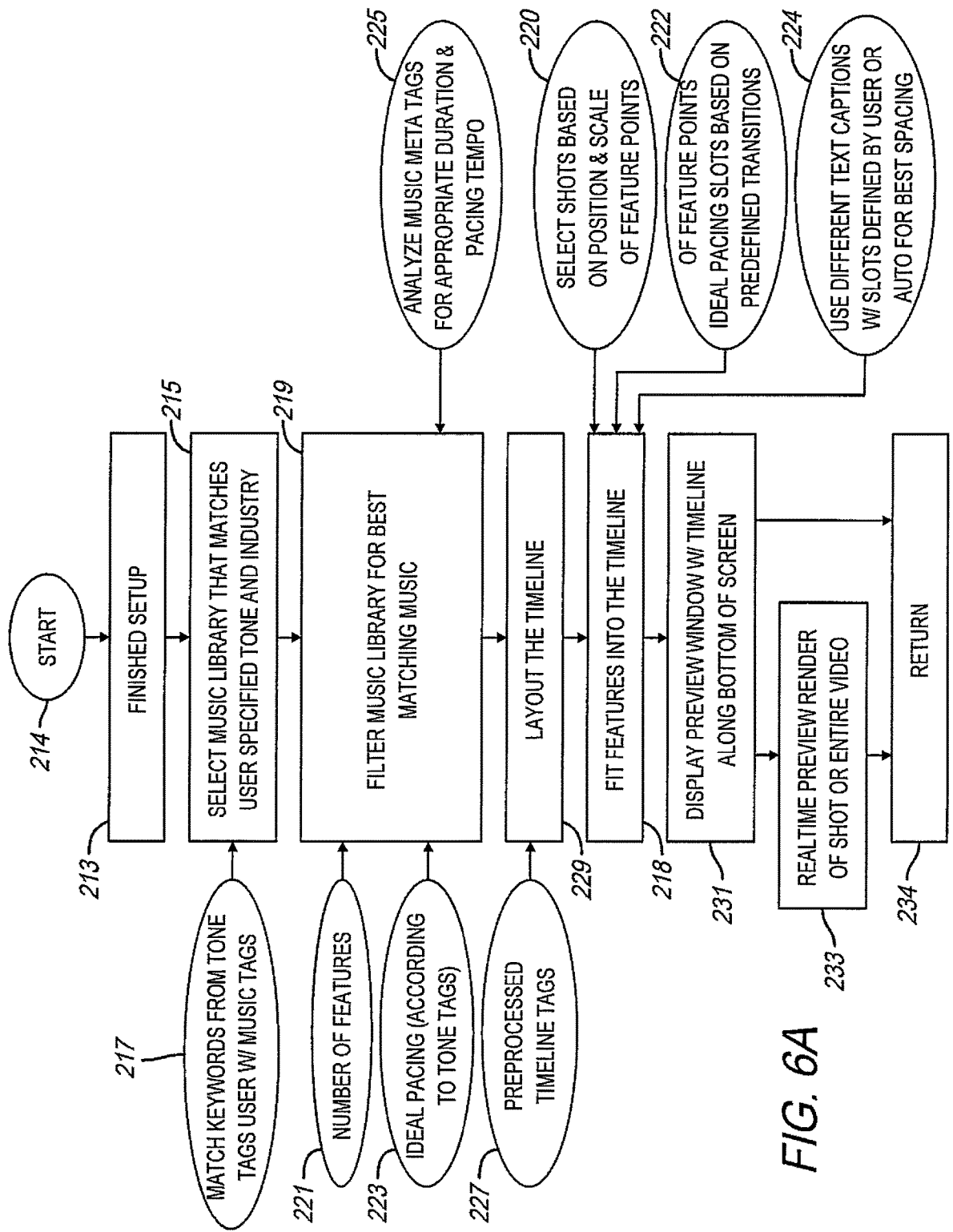
FIG. 6a is a flowchart illustrating a step integral to a computer-implemented improved system for producing studio-quality e-commerce product videos according to the teachings of the present invention.

As shown in the flowchart in FIG. 6a, once all the designated features have been inputted into the system, the user then starts 214 by clicking the "Finished Setup" button 213, which processes all the selections. Predicated upon the target industry, target audience, type of product and the tone and theme identifying tags provided by the user earlier in the process, the system automatically selects or filters a set of music libraries 215 that will best match the user's creative goals for the product model. In this regard, a catalogue of music is provided with music selections associated with meta tags using the same keywords or terms chosen by the user to identify the branding theme or tone 217, target audience and target industry for the product. The system then analyzes the number and complexity (e.g. the amount of text) of the features 221 desired to be highlighted and, based on this information, the system narrows the selection of music options to a piece that will conform to the estimated duration and pacing 223, 225 of the product video.

The system will select from among the various options the best music choice 219 according to the aforesaid criteria and then lay out the feature content 229 according to a preprocessed timeline of the music 227. The preprocessing of the music, as described, also includes the identification of moments in the musical when certain transitions would be most appropriate. More specifically, this means analyzing the music files to identify the moments in each piece where there is a beat change or a heavy hit occurs. This information can then be integrated into the system and, more particularly the video content itself. This process begins with tagged meta information previously provided. Eventually the system will automate a portion of this work (i.e. tagged meta information) by analyzing the beat and tempo of an audio file to determine the ideal edit points. At its more complex level it means that there are now an assortment of transition points and options that the system has identified as viable, which will then be used to optimally integrate the user's content.

After the initial video generation is complete, the user is presented with a preview screen with a complete automatically populated timeline of the video at the bottom 231. The preview window currently displays content relevant to the selected shot on the timeline and allows for the preview of both individual shots as well as the entire piece 233. The timeline spans the bottom of the screen and chronologically lays out the user's content with the beginning of the piece starting on the left and progressing across to the right side of the screen with the final shot at the very far right. The timeline displays the duration of the piece along the top and denotes different increments of time representing time stamps of the video moving along the timeline. Features are fit into the timeline 218 with shots selected based on position and scale of feature points 220. Correct shots are inserted into ideal pacing slots based on predetermined transitions 222 using different text captions with slots defined by user or automatically for best pacing 224. By clicking return 234 the user may return to any step in the system user elects.

Figure 6B:
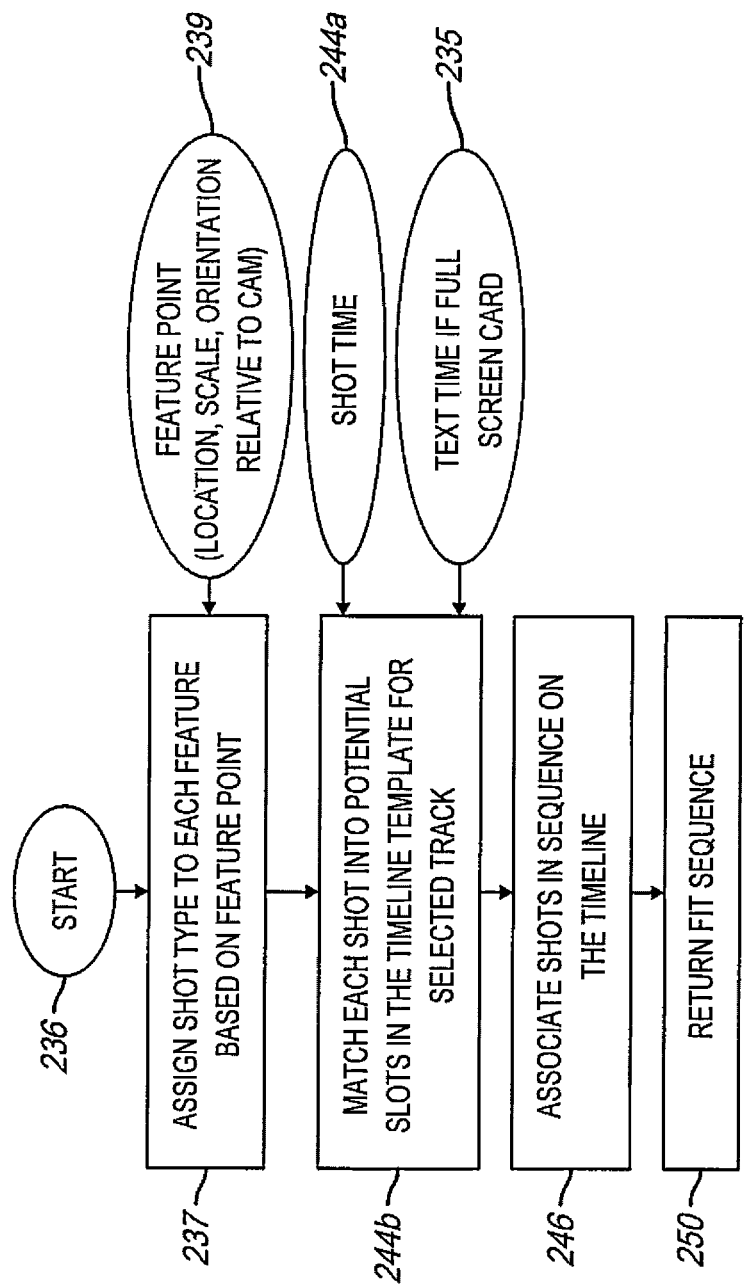
FIG. 6b is a flowchart illustrating a step integral to a computer-implemented improved system for producing studio-quality e-commerce product videos according to the teachings of the present invention.

As shown in the flowchart in FIG. 6b, the user starts 236 with the actual content of the timeline consisting of several tabs, each representing a feature or a general shot of the product. Each of these shots is individually generated based on the position of key features of the product and additionally may display text on screen provided by the user. This text can be in the form of a full screen shot that has just the text (a "full screen card") 235 that appears before or after the feature it describes. Shot types are assigned to each feature based on feature point 237, including, for example, the location, scale, and orientation relative to the camera 239. Each shot according to content and shot time 244a is matched into potential slots in the timeline template for a selected track 244b. Shots are inserted in sequence onto the timeline 246. Clicking the return button accesses the fit sequence of the shots on the timeline 250. Alternatively, a partial text box can allow the text to be overlaid and positioned alongside the product. The system determines where in the screen space there is an appropriate sized void (space) in order to make sure that the automatically placed text is as legible as possible and does not overlap with the underlying model.

Figure 7:
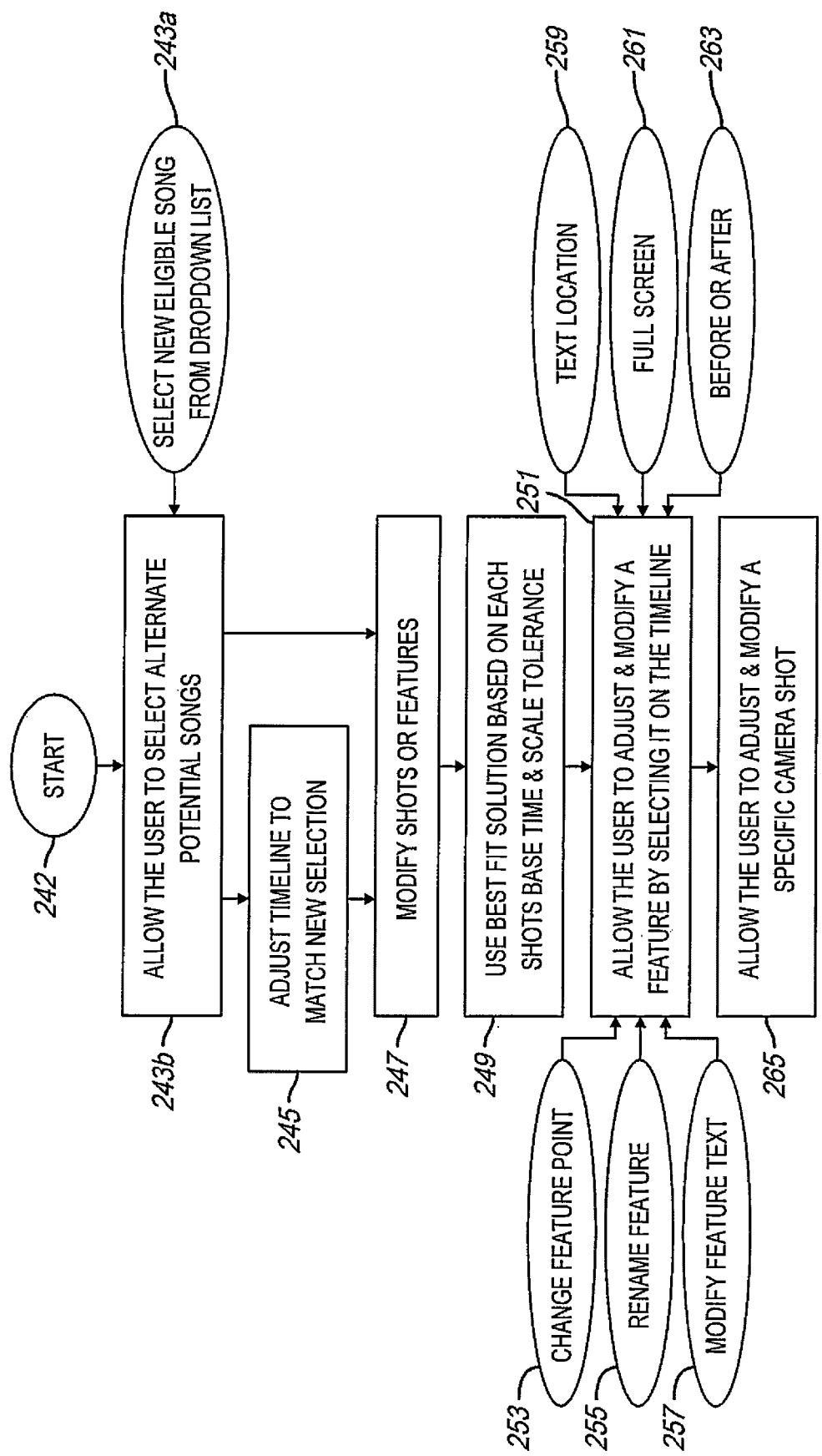
FIG. 7 is a flowchart illustrating a step integral to a computer-implemented improved system for producing studio-quality e-commerce product videos according to the teachings of the present invention.

As shown in the flowchart in FIG. 7, the user now has a complete video piece that the user can elect to retain, though there are also several ways in which the user can modify the video. The user starts 242 by clicking on the music selection drop down list to present the user with a variety of eligible songs 243a from which the user may choose a selection. Should the user decide to select another song 243b, the timeline will automatically shift and scale in order to adhere to the ideal edit points of the new song selection 245. The system does this by finding a best fit solution with the existing shots and their base sizes (every shot has a base duration, for example, 2.5 seconds, and then a tolerance that allows the system to flawlessly scale the shot up or down to match the ideal cut points nearest the segment) 249. This means that the piece will maintain as many of the same shots and features as the new song allows, but will allow the user, in a single click, to change the overall feel of the piece by simply selecting a new song. This type of change would normally require a great degree of similarity between the two songs.

An additional level of custom controls allows the user to modify any of the features and shots 247. By simply clicking on a tab on the timeline 251 the user can access the properties associated with a given segment. These properties include the feature location on the product and allow the user to once again change the previously designated regions the feature shot should focus on or allows the user once again to select a new point 253 on the 3D model as its feature location. The basic information about the feature can also be edited. This includes both the name of the feature 255 and any on screen copy 257 that the user wants to associate with this feature. The copy settings also allow the user to decide if the text 259 should appear on a full screen card 261 before or after the shot 263, or if the text should be displayed in the shot on the screen along with the product. The user can also set a custom screen location for the text to appear by dragging the box where the user wants the text to appear on screen.

For each feature there is a set of recommended camera shots to use with that feature. These shots use a wide array of focuses (near focus vs far focus vs auto focus), camera angles (low to high, high to low, panning, etc.), movement speeds (either in time to complete the move in seconds or units of speed), and more. The system automatically narrows down all available shots to a list of suggested shots based on the scale of the feature point along with information about the product. It will even make suggestions based on which shots it determines to work best with the specific segment of the song during which it will be used. The user has the option to remain with the system's automatic selection or choose from another recommended or custom shot. Many of the shots are designed to work with a custom focus point and will maintain focus on the physical location that the user defines as the feature point. Alternatively, some of the shots include unique effects that will modify or "rack" the focus as the virtual camera makes a specific move. Certain shots will also allow for the user to select an ideal speed or shot duration enabling the user to ensure that the most important features are adequately displayed 265.

Along with the specific feature shots, there may be opportunities to include non-feature specific content. This might include overview shots and reveal shots, which would be listed alongside the feature shots and the two types would function in effectively the same way on the timeline. The only difference is that the non-feature shots are more dedicated to overview shots of the product rather than feature shots which exist to highlight or demonstrate specific features of a product. After the user makes modifications to a shot, the user can simply click the play button on that tab in order to access a preview of the shot in its then current form.

Figure 8:
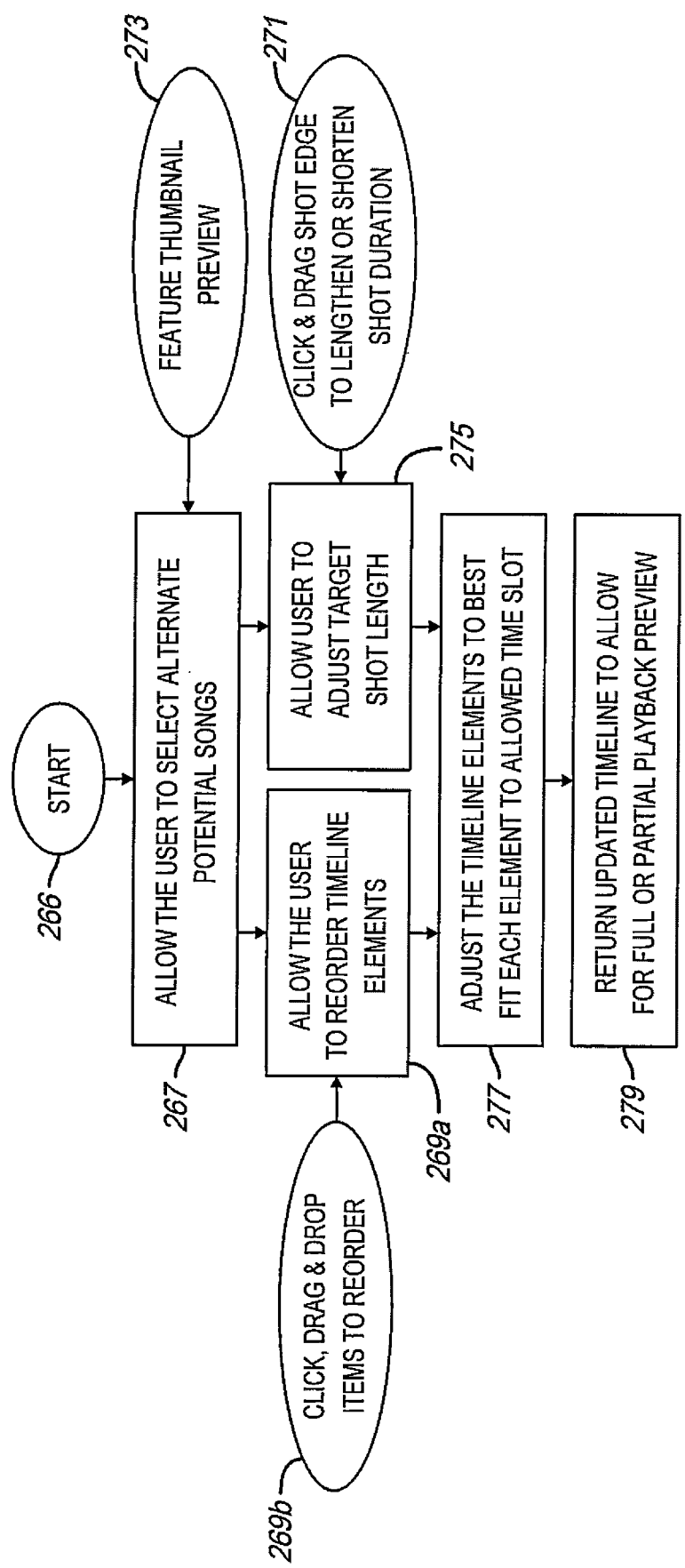
FIG. 8 is a flowchart illustrating a step integral to a computer-implemented improved system for producing studio-quality e-commerce product videos according to the teachings of the present invention.

As shown in the flowchart in FIG. 8, the user starts 266 by displaying a visual representation of the current timeline 267. In addition to being able to change the song and modify individual shots, the user can also rearrange the shots on the timeline. There may be some constraints regarding the use of certain types of shots, but for the most part the user can simply click and hold on a shot tab in order to allow the shot to be dragged around and even rearranged on the timeline. Once the user approves the placement of the shot on the timeline, the user can release the appropriate button and the shots will automatically rearrange and adjust themselves according to the new order of the timeline 269*a*, 269*b*. Additionally, the timeline user interface allows for the user to interact with the shots by clicking and dragging either the left or right edge of the shot tab in order to either increase or shorten the duration of a specific shot 271. By clicking on the right edge of a shot and dragging it to the right, the duration of the shot will be extended, and if dragged to the left the shot duration will be shortened 275. After rearranging or changing the timeline elements to best fit each element to the allowed time slot 277, the user can click the preview play button in the corner of the application window in order to trigger a full screen full length thumbnail preview of the product 273. Finally, the user may return to the updated timeline to allow for a full or partial playback review 279.

Figure 9:
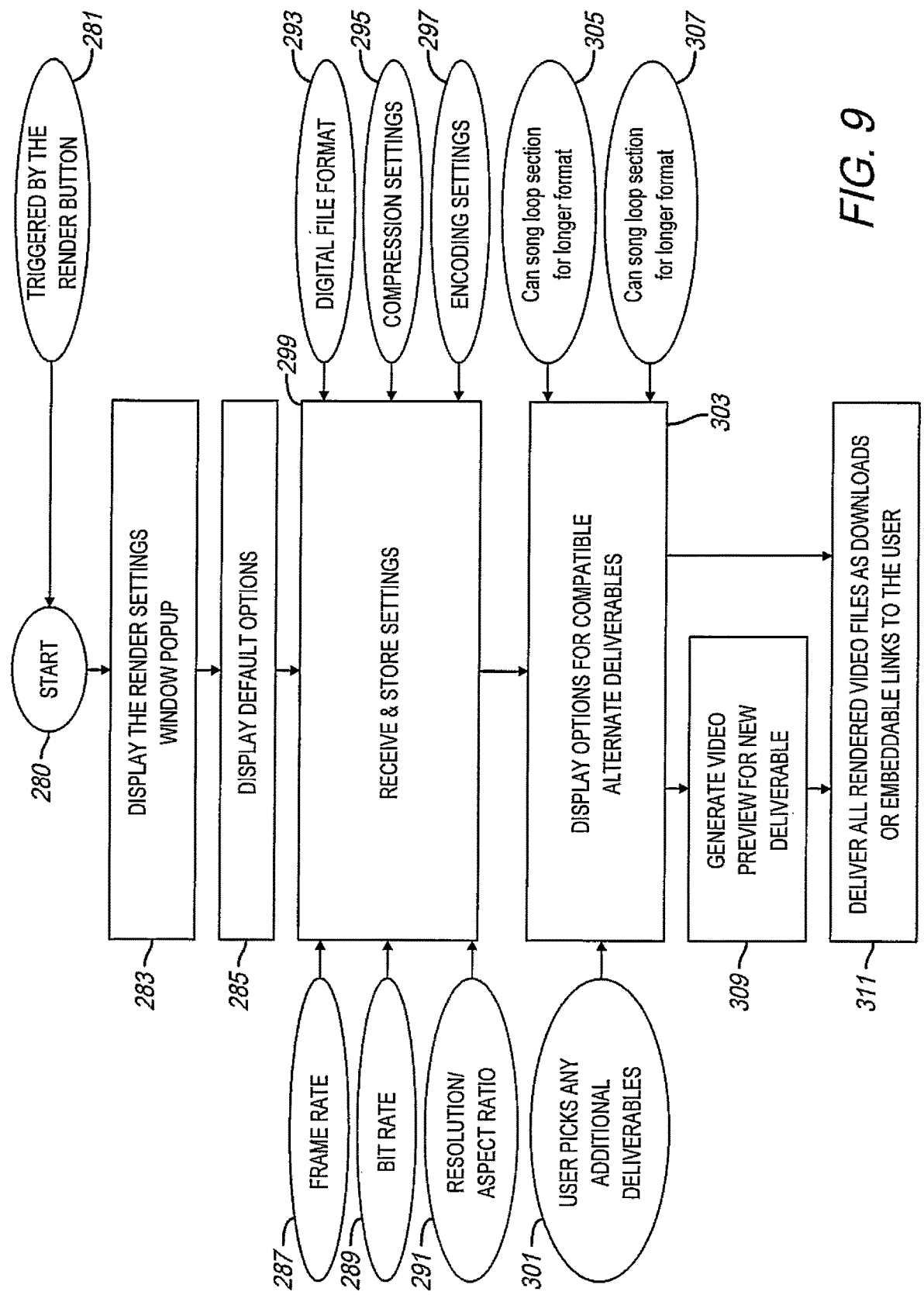
FIG. 9 is a flowchart illustrating a step integral to a computer-implemented improved system for producing studio-quality e-commerce product videos according to the teachings of the present invention.

As shown in the flowchart in FIG. 9, once the user is completely satisfied with the real time rendered preview of the content, the user starts 280 by clicking on the "Render" button 281 to initiate a settings popup window 283, which prompts the user for specific requirements of the deliverables. The frame rate 287, bit rate 289, resolution/aspect ratio 291, digital file format 293, compression 295 and encoding 297 settings are then received and stored 299. The user is presented with several digital deliverable options to choose from 301 to help select ideal default digital media file format options 285 and compression and encoding settings. Options are then displayed for compatible alternative deliverables 303. After making file format selections, the user can also utilize an important and differentiating strength of the system and select an entirely different deliverable asset, which is to say, rather than simply selecting a frame rate, resolution and bit rate, the user can select a longer or shorter piece. The system then selects a new track or adapts the current one by adding or removing the repeating middle of the song to lengthen the song loop 305 or shorten it 307 to match the new target duration. The content is then scaled dynamically to automatically match the new ideal cut points. A video preview 309 is generated for new deliverables.

After selecting the target platform and adjusting the file settings, the "Okay" button is clicked. If there is an interest in an automatically generated 15 second teaser version of the video to be used on social media and/or a 60 second longer piece to play on the user's website homepage, the desired selection may be made. The system will automatically generate these alternate deliverables and render out high quality versions. All deliverables of various lengths and aspect ratios are then either downloaded or the user is presented with streaming/embeddable links in the case of the Cloud rendering configuration. Where the local software configuration is utilized, the user is presented with a file browser popup and prompted to select a location for saving the videos. In any event, all rendered video files are delivered as downloads or embeddable links 311.

According to an alternative embodiment of the present invention, as defined in new independent claim 6 and new claims 7 through 12 depending therefrom, a user-controlled computer implemented system, automated or otherwise, for producing improved e-commerce product videos displaying a 3D rendering of the product created from a 3D model of the product having features and shots and internal and external components comprises the steps of: establishing a connection for the system locally on a computer having the requisite software between the computer and an off-site server or cloud computer, each of these connections utilizing a web portal accessible by logging in using a personal user name and password; identifying and selecting the 3D model of a product from the group comprised of a concept rendering, a technical engineering drawing, a schematic drawing, a manufacturing drawing, a blueprint, and promotional materials available online or otherwise, and at least one other source from which to select a 3D model of a product, with all or any portion of this group depicting external and internal components of the product; creating a file for a new or updated profile of the 3D model and assigning a name to the 3D model file with the 3D model file then to be saved to the computer; identifying a type of target video from the group comprised of a 360 degree turntable video, a 30 second explainer video, a 30 second commercial, and at least one other type of target video; identifying a target industry for the product from the group comprised of the technology, automotive, home goods, personal care, fitness, and entertainment sectors, and at least one other industry sector; identifying a target platform for the product from the group comprised of a retail store page, a product display page, an e-commerce website, a social media website, an advertisement displayed on an internet site, and at least one other platform; identifying a branding theme for the product from the group comprised of luxury, fun, dramatic, fashionable, intense and family-friendly themes, and at least one other branding theme; saving data comprising the 3D model profile identified by the assigned name, identified target industry, identified target platform, and identified branding theme to the 3D model file on the computer; selecting the 3D model file from among the new or updated 3D model file profiles saved to the computer; uploading the 3D model file data from the computer to the off-site server or cloud computer and then correspondingly downloading the 3D model file data to the computer; identifying and saving the computer file components to the 3D model file according to the shared common materials and geometric and volumetric sizes and shapes wherein the shared common materials and geometric and volumetric sizes and shapes are evaluated and commonly grouped; identifying the internal components of the product using ray traces directing light rays toward the center of the 3D model wherein these components may be identified and eliminated from the 3D model, as the user elects, with the identified eliminated internal components being saved to the 3D model file; organizing the 3D model by reducing the number of components according to consolidated groupings such that the components may be transferred into a different group, added to a new group or eliminated altogether with the identified transferred, added or eliminated components being saved to the 3D model file; manipulating the 3D model in real time using a camera to orbit the 3D model and zoom in and out for locating key feature points and associating the components incorporating the features with definitions specific to the features, with the key location points and defined component features being saved to the 3D model file; providing information about the features, including name identifier and onscreen text displaying facts explaining how individual components appear, function and interrelate, with the provided information being saved to the 3D model file; providing a catalog of music with music selections associated with the same key words or terms that identify the branding theme, target platform, and target industry, and selecting the music that will conform to the estimated duration and pacing of the 3D product video along a timeline with the associated music selections and the selected conformable music being saved to the 3D model file; providing a catalog of backdrops, such as, for example, backgrounds associated with keywords that identify the branding theme, target platform and target industry wherein a selected backdrop or background for the product is identified from the group comprised of a black stage (backing), a white stage (backing), any type of setting or location against or within which the product is placed, and at least one other type of backdrop or background, the selected backdrop or background being saved to the computer; displaying segments comprising the content of the timeline with each of the segments representing at least one of the shots consisting of at least one of the features of the 3D model, with each of the shots being individually generated based on the position and size of the key feature of the 3D model wherein a list of varied shot animations is provided to the user to view and select, with each of the displayed segments being representative of a corresponding shot having at least one of the features being saved to a computer; creating a 3D video rendering from the 3D model of the product according to the system of steps defining the present invention and delivering the 3D video rendering as downloads or embeddable links.

With greater particularity, and with reference now to a detailed description of the alternative embodiment of the present invention, to start 100 the process, as shown in the flowchart in FIG. 1, the user must establish a connection for the system either locally on the user's own computer having the requisite software or via an offsite server or a cloud computer through a web portal employing a personal username 101 and password 103 to login 105. Once logged in, the user can load existing product content from memory or the server 110, create a new product profile, create a new project or update an existing one 107, which may be identified by a thumbnail image and name to enable easy access 109. Establishing a new product profile 111 involves naming the product 113 and then, as the user may elect, identifying a type of target video 114 from among the group comprised of a 360 degree turntable video (which consists of a video with a static camera displaying the product rotating around its central axis incrementally frame by frame), a 30 second explainer video (e.g., a 30 second commercial), an edited video with multiple shots focusing on specific features set to music with accompanying text identifying the product name, the company name, and defined features, and at least one other type of target video; identifying the target industry 115, inclusive, e.g. of the automotive, home goods, personal care, fitness, technology and entertainment sectors, among other target industry sector choices, followed sometimes by identifying a subcategory of a particular industry, such as an industry involved in the manufacture of mobile devices; and a target platform 117 inclusive, e.g. of the group comprised of a retail store webpage, an e-commerce website, a website listing of a product on an internet commerce site, an advertisement displayed on an internet site, a webstore, social media website, or mobile app, among other target platform choices. To help identify an appropriate branding theme or tone for the product, choices are available from among specific tags 119 or sectors relative to the group consisting of the luxury, fun, dramatic, family-friendly, dark, colorful, intense, fashionable, and serious themes, among other branding theme or sector choices. The project information is then uploaded 120 and the data is saved 121. The user may then later return to the current project 123.

An example of a product profile for which the present invention may be employed is a smartphone product, which shall be named "myPHONE", and the user will create by first selecting the target industry (for example, "technology") followed by a subcategory, such as "mobile devices." Since this product would target consumers generally, the target platform would include, for example, consumer goods marketed on a retail store website page, product display webpage, in an advertisement displayed on an internet site, an e-commerce website, a website listing of a product on an internet commerce site, a webstore, a social media website or a mobile app, and the user may then select a branding theme associate with various tags or sectors, including, for example, the fun, luxury, dramatic, family-friendly, dark, colorful, intense, fashionable and serious themes or sectors, among other branding theme or sector choices.

The process shown in the flowchart in FIG. 2A starts 124 by using the appropriate file path 127 to locate an existing 3D model of the product (also known as a 3D asset) 125 generated from a source (e.g. software package 129) consisting of, for example, a concept rendering, a technical engineering drawing, a manufacturing drawing, a schematic drawing, a blueprint or promotional materials depicting the model. The 3D asset or product file is saved 135 in a proprietary file format (e.g. .fbx), which is used to provide interoperability between digital content creation applications. In the present scenario, to upload the 3D product file, the user first clicks a button labeled "Upload a New Model", which produces a pop up window to permit the user to browse the local computer files 131. A 3D product file is then selected for use in the processing of the product profile and then either uploaded locally to the user's own computer software or uploaded to an offsite hosted server or the cloud computer 133. A progress tracking bar is displayed and can be observed by the user as the 3D model is uploaded and processed. The system of the present invention analyzes the 3D model of the product to best identify the various components of the product that are made from the same materials and to further identify the components that can be grouped 137 into single pieces, all of which are then saved 139. An example relative to the 3D model of the myPHONE in the instant case are symmetrical pieces comprising the metal bezel framing the screen, which typically share a common material, i.e. metal and, thus, may be grouped together. The user may then return 138 to any step in the sequence of data entries in the system.

Another aspect of the system of the present invention, as shown in FIG. 2B, starts 142 with the identification and exclusion of certain internal components 141 of the product. This is accomplished by simulating many light rays, also known as ray traces 143, that are emitted from points around the model and directed inwards toward the model's center. Model components are thus identified and located and parts that are determined to be completely occluded may be eliminated or hidden 145 from the model renderings and marked 149. A list of internal components is then saved 147. In the "myPHONE" example, since the speakers and vibration units in the engineered model are internal and, thus, hidden from view, they may be removed from the rendering. Internal components may be eliminated from the system entirely or grouped together and held in the system to be accessed and visually revealed at another time, as the user may elect.

For product models that include tags consisting of keywords, the keywords are used to group component pieces having the same common feature or material 151. Components comprised of the same material, for example metal or plastic, can be grouped according to that material. The system essentially reads through existing tags or keywords in the model data and creates a list for each unique tag or keyword 153, then adds to that list all other components sharing the same tag or keyword. Where no preset tags or keywords are assigned, the system of the present invention scans all components for common geometric and/or volumetric sizes and shapes and material compositions and then compares and evaluates each in order to group identical 163 components accordingly 155, 157. If the system finds any identical pieces it defaults to operating under the assumption that these identical pieces are made of the same material and should look visually the same. Finally, the system identifies small group pieces 159. To do this, the volumetrically sorted list of pieces is used and proximity tests are run to measure the number of similarly sized parts within a set distance. This set distance is abstracted to the user but enables the user to make modifications to the "Grouping Tolerance" 161, which will determine how aggressively the system will attempt to group these small pieces. The user may then click on the return button to access group data information 162, as elected.

The step in the process, as shown in the flowchart in FIG. 3, starts 164 after the system has completed its analysis of the product model whereupon the user is presented with a 3D viewer window (view port) that displays the 3D model selected along with a list of the groupings 165 (e.g. components comprised of the same material) and simplifications (e.g. components grouped into single pieces or elimination of internal components) that the system has determined to be most optimal. Optimization of the model results in a more efficient system effectively reducing the amount of components that need to be selected from possibly many thousands to relatively few according to their consolidated groupings. At this stage, components can be transferred into different groups 167, eliminated altogether or included within a new grouping 169. The system may also be revised to affect the automatic interpretation of the product model. Again, incorrect groupings can be corrected 171, misidentification of components can be resolved and components can be properly color coded if they were previously not coded correctly.

All of the above steps can be accomplished simply by clicking on the item on the 3D model viewer window or by selecting among a series of drop down lists containing individual components in a grouping. An incorrectly grouped component can either be moved into another established group by clicking the button designated "Regroup" 175 or may be made the first element of a new group by clicking the button designated "Create a New Group" 169. In the "myPHONE" example, if the system misidentified the volume switch on the side of the "myPHONE" as being effectively part of the aluminum casing of the phone and, therefore, color-coded the same as the body of the "myPHONE", the user would have this opportunity to correct the grouping and clarify that the volume button is a unique and independent piece and should be kept separate and most likely made of a material other than that of the casing.

After the completion of the arrangement, designations or revisions of the various groupings or their component parts according to size and shape, for example, the user is presented with a variety of materials and colors from which to select for the components 177, 177a, 177b. This is achieved by employing a pop up window containing a drop down list of various materials, e.g. metal or plastic, after which the user is presented with color options to enable the customization of colors for all the various components. All selections, changes, etc. are then saved 179 at one time or may be saved when they occur at any other point during the process. The button 180 enables the user to return to any step in the system the user elects.

As shown in the flowchart in FIG. 4, the user starts 182 with the system having a complete visual representation of the product and an approximate understanding of the component make up of the product 3D model, including material composition, and how these components appear, function and interrelate, as further described below. Thus, the user is presented with the Feature Designation Screen 181 which depicts a 3D preview of the 3D product model and several onscreen controls 183, including rotation controls 185 allowing the camera to orbit the product 187 and zoom-in and zoom-out control buttons 189. The onscreen controls include input controls which, when operated by right-clicking the mouse, for example, enable the user to drag the product from side to side or to rotate it. A mouse wheel can also be scrolled up or down to zoom in on or out from the product.

The input controls enable the user to manipulate the 3D model in real time and locate its key feature points, which can be revised at any time, but initially serve to associate a set of physical components or region of the 3D model with feature designations 191. From an operational perspective, the user clicks the "Add Feature Point" button 193 and then clicks the 3D model part the user elects to associate with that feature. Placing the cursor over the feature point reveals controls that allow the repositioning and/or resizing of the feature point selected 195, 197.

The feature points are then saved 199. In the "myPHONE" product example, the user would typically select key features, including, for example, the screen, the speaker, the back piece of the body casing, and the camera. The user may then return 200 to any step in the sequence the user elects.

As depicted in the flowchart in FIG. 5, the user starts 202 by incorporating each feature into the system and then highlights or explains each feature with the use of appropriate information for this purpose. This part of the process starts by clicking the "Creation/Add Feature" button 201 which brings up the feature creation tab for the new or added generated feature. The user may then provide information about the feature, including, for example, the identifier or name 203 of the feature and any onscreen text 205, including without limitation, facts regarding how individual components appear, function and interrelate relative to the feature the user wishes to display. In this way, any of the product feature points on the 3D model already selected from the points on the drop down list 209 can be associated with a particular feature or location now or existing 211. In doing so, the system automatically knows to associate the feature with a particular feature point on the 3D model 207 and to reveal the selected information associated with the feature. Using the "myPHONE" product example, one of the features is the high-resolution camera. The user inputs the name "Camera Feature" and then the text (or copy) "Featuring a New Ultra High-Resolution Camera" is shown alongside the feature. The camera location is then selected from the list of feature points that were designated previously or an entirely new feature of the model can be selected to focus on creating a new Feature Point in the process. Clicking on the return button 208 returns the user to any step in the sequence the user elects.

As shown in the flowchart in FIG. 6A, once all the designated features have been inputted into the system, the user then starts 214 by clicking the "Finished Setup" button 213, which processes all the selections. Predicated upon the chosen target industry, target platform, type of product and the tone and branding theme identifying tags provided by the user earlier in the process, the system automatically selects or filters a set of music libraries 215 that will best match the user's creative goals for the product model. In this regard, a catalogue of music is provided with music selections associated with meta tags using the same keywords or terms chosen by the user to identify the branding theme or tone 217, target platform and target industry for the product. The system then analyzes the number and complexity (e.g. the amount of text) of the features 221 desired to be highlighted and, based on this information, the system narrows the selection of music options to a piece that will conform to the estimated duration and pacing 223, 225 of the product video along a timeline containing predetermined edit points to switch between shots. Also provided is a catalog of backdrops or backgrounds associated with keywords that identify the branding theme, the target platform, and the target industry, wherein the selected backdrop or background for the product is identified from the group comprised of a black stage or backing, a white stage or backing, a residential or commercial setting, a digital recreation of a location or background against or within which the product 3D model may be placed, and at least one other backdrop or background choice, the selected backdrop or background being saved to the computer.

The system will select from among the various options the best music choice 219 according to the aforesaid criteria and then lay out the feature content 229 according to a preprocessed timeline of the music 227. The preprocessing of the music, as described, also includes the identification of moments in the musical when certain transitions would be most appropriate. More specifically, this means analyzing the music files to identify the moments in each piece where there is a beat change or a heavy hit occurs. This information can then be integrated into the system and, more particularly the video content itself. This process begins with tagged meta information previously provided. Eventually the system will automate a portion of this work (i.e. tagged meta information) by analyzing the beat and tempo of an audio file to determine the ideal edit points. At its more complex level it means that there are now an assortment of transition points and options that the system has identified as viable, which will then be used to optimally integrate the user's content.

After the initial video generation is complete, the user is presented with a preview screen with a complete automatically populated timeline of the video at the bottom 231. The preview window currently displays content relevant to the selected shot on the timeline and allows for the preview of both individual shots as well as the entire piece 233. The timeline spans the bottom of the screen and chronologically lays out the user's content with the beginning of the piece starting on the left and progressing across to the right side of the screen with the final shot at the very far right. The timeline displays the duration of the piece along the top and denotes different increments of time representing time stamps of the video moving along the timeline. Features are fit into the timeline 218 with shots selected based on position and scale of feature points 220. Correct shots are inserted into ideal pacing slots based on predetermined transitions 222 using different text captions with slots defined by user or automatically for best pacing 224. By clicking return 234 the user may return to any step in the system user elects.

As shown in the flowchart in FIG. 6B, the user starts 236 with the actual content of the timeline consisting of the representation of a feature or a general shot of the product. Each of these shots is individually generated based on the position of key features of the product and additionally may display text on screen provided by the user. This text can be in the form of a full screen shot that has just the text (a "full screen card") 235 that appears before or after the feature it describes. Shot types are assigned to each feature based on feature point 237, including, for example, the location, scale, and orientation relative to the camera 239. Each shot according to content and shot time 244*a* is matched into potential slots in the timeline template for a selected track 244*b*. Shots are inserted in sequence onto the timeline 246. Clicking the return button accesses the fit sequence of the shots on the timeline 250. Alternatively, a partial text box can allow the text to be overlaid and positioned alongside the product. The system determines where in the screen space there is an appropriate sized void (space) in order to make sure that the automatically placed text is as legible as possible and does not overlap with the underlying model.

As shown in the flowchart in FIG. 7, the user now has a complete video piece that the user can elect to retain, though there are also several ways in which the user can modify the video. The user starts 242 by clicking on the music selection drop down list to present the user with a variety of eligible songs 243a from which the user may choose a selection. Should the user decide to select another song 243b, the timeline will automatically shift and scale in order to adhere to the ideal edit points of the new song selection 245. The system does this by finding a best fit solution with the existing shots and their base sizes (every shot has a base duration, for example, 2.5 seconds, and then a tolerance that allows the system to flawlessly scale the shot up or down to match the ideal cut points nearest the segment) 249. This means that the piece will maintain as many of the same shots and features as the new song allows, but will allow the user, in a single click, to change the overall feel of the piece by simply selecting a new song. This type of change would normally require a great degree of similarity between the two songs.

An additional level of custom controls allows the user to modify any of the features and shots 247. By simply clicking on a point on the timeline 251 the user can access the properties associated with a given segment. These properties include the feature location on the product and allow the user to once again change the previously designated regions the feature shot should focus on or allows the user once again to select a new point 253 on the 3D model as its feature location. The basic information about the feature can also be edited. This includes both the name of the feature 255 and any on screen copy 257 that the user wants to associate with this feature. The copy settings also allow the user to decide if the text 259 should appear on a full screen card 261 before or after the shot 263, or if the text should be displayed in the shot on the screen along with the product. The user can also set a custom screen location for the text to appear by dragging the box where the user wants the text to appear on screen.

For each feature there is a set of recommended camera shots to use with that feature. These shots use a wide array of focuses (near focus vs far focus vs auto focus), camera angles (low to high, high to low, panning, etc.), movement speeds (either in time to complete the move in seconds or units of speed), and more. The system automatically narrows down all available shots to a list of suggested shots based on the scale of the feature point along with information about the product. It will even make suggestions based on which shots it determines to work best with the specific segment of the song during which it will be used. The user has the option to remain with the system's automatic selection or choose from another recommended or custom shot. Many of the shots are designed to work with a custom focus point and will maintain focus on the physical location that the user defines as the feature point. Alternatively, some of the shots include unique effects that will modify or "rack" the focus as the virtual camera makes a specific move. Certain shots will also allow for the user to select an ideal speed or shot duration enabling the user to ensure that the most important features are adequately displayed 265.

Along with the specific feature shots, there may be opportunities to include non-feature specific content. This might include overview shots and reveal shots, which would be listed alongside the feature shots and the two types would function in effectively the same way on the timeline. The only difference is that the non-feature shots are more dedicated to overview shots of the product rather than feature shots which exist to highlight or demonstrate specific features of a product. After the user makes modifications to a shot, the user can simply click the play button on that tab in order to access a preview of the shot in its then current form.

As shown in the flowchart in FIG. 8, the user starts 266 by displaying a visual representation of the current timeline 267. In addition to being able to change the song and modify individual shots, the user can also rearrange the shots on the timeline. There may be some constraints regarding the use of certain types of shots, but for the most part the user can simply click and hold on a shot in order to allow the shot to be dragged around and even rearranged on the timeline. Once the user approves the placement of the shot on the timeline, the user can release the appropriate button and the shots will automatically rearrange and adjust themselves according to the new order of the timeline 269a, 269b. Additionally, the timeline user interface allows for the user to interact with the shots by clicking and dragging either the left or right edge of the shot tab in order to either increase or shorten the duration of a specific shot 271. By clicking on the right edge of a shot and dragging it to the right, the duration of the shot will be extended, and if dragged to the left the shot duration will be shortened 275. After rearranging or changing the timeline elements to best fit each element to the allowed time slot 277, the user can click the preview play button in the corner of the application window in order to trigger a full screen full length thumbnail preview of the product 273. Finally, the user may return to the updated timeline to allow for a full or partial playback review 279.

As shown in the flowchart in FIG. 9, once the user is completely satisfied with the real time rendered preview of the content, the user starts 280 by clicking on the "Render" button 281 to initiate a settings popup window 283, which prompts the user for specific requirements of the deliverables. The frame rate 287, bit rate 289, resolution/aspect ratio 291, digital file format 293, compression 295 and encoding 297 settings are then received and stored 299. The user is presented with several digital deliverable options to choose from 301 to help select ideal default digital media file format options 285 and compression and encoding settings. Options are then displayed for compatible alternative deliverables 303. After making file format selections, the user can also utilize an important and differentiating strength of the system and select an entirely different deliverable asset, which is to say, rather than simply selecting a frame rate, resolution and bit rate, the user can select a longer or shorter piece. The system then selects a new track or adapts the current one by adding or removing the repeating middle of the song to lengthen the song loop 305 or shorten it 307 to match the target duration. The content is then scaled dynamically to automatically match the new ideal cut points. A video preview 309 is generated for new deliverables.

After selecting the appropriate target category and adjusting the file settings, the "Okay" button is clicked. If there is an interest in an automatically generated 15 second teaser version of the video to be used on social media and/or a 60 second longer piece to play on the user's website homepage, the desired selection may be made. The system will automatically generate these alternate deliverables and render out high quality versions. All deliverables of various lengths and aspect ratios are then either downloaded or the user is presented with streaming/embeddable links in the case of the cloud computer rendering configuration. Where the local software configuration is utilized, the user is presented with a file browser popup and prompted to select a location for saving the videos. In any event, all rendered video files are delivered as downloads or embeddable links 311.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

The invention claimed is:

1. A user-controlled computer implemented system for producing improved e-commerce product videos displaying a 3D rendering of said product created from a 3D model of said product, said 3D rendering of said product having features and shots and internal and external components, the system comprising the steps of:

establishing a connection for said system locally on a computer having the requisite software, between said computer and an offsite server or between said computer and the Cloud, each of said connections utilizing a web portal accessible by logging in using a personal user name and password;

identifying and selecting said 3D model of said product;

creating a file for a new or updated profile of said 3D model of said product and assigning a name to said 3D model;

identifying a target industry for said product;

identifying a target audience for said product;

identifying a branding theme for said product;

saving data comprising said 3D model profile identified by said assigned name and said identified target industry, said identified target audience, and said identified branding theme to said 3D model file on said computer;

selecting said 3D model file from among said new or updated said 3D model file profiles on said computer;

uploading said 3D model file data from said computer to said offsite server or to said Cloud and correspondingly downloading said 3D model file data to said computer, as needed;

identifying and saving to said 3D model file on said computer said components of said product according to shared common materials and geometric and volumetric sizes and shapes wherein said shared common materials and geometric and volumetric sizes and shapes are compared and commonly grouped;

identifying said internal components of said product using ray traces directing light rays toward the center of said 3D model wherein said components are identified and eliminated from said 3D model, as said user elects, said identified eliminated internal components being saved to said 3D model file on said computer;

organizing said components of said 3D model by reducing the number of said components according to consolidated groupings wherein said components may be transferred into a different group, added to a new group or eliminated, said transferred, added or eliminated components being saved to said 3D model file on said computer;

manipulating said 3D model in real time using a camera to orbit said 3D model and relative to said 3D model to zoom in and out for locating key points of said features and associating said components with definitions specific to said features, said key location points and said defined component features being saved to said 3D model file on said computer;

providing information about said features, said information comprising individual terms identifying each of said features and onscreen text displaying facts explaining how said features and components appear, function and interrelate, wherein said information is saved to said 3D model file on said computer;

providing a catalog of music having music selections associated with key words that identify said branding theme, said target audience and said target industry, and selecting music from said music catalog conformable to the estimated duration and pacing of said 3D product video along a timeline, said associated music selections and said selected conformable music being saved to said 3D model file on said computer;

displaying tabs comprising the content of said timeline, each said tab representing said feature or said shot of said 3D model, and each said shot being individually generated based on the position of said key features of said 3D model, each said displayed tab representative of a corresponding said feature and said shot being saved to said 3D model file on said computer;

creating a 3D video rendering from said 3D model of said product according to said system of steps; and, delivering said 3D video rendering as downloads or embeddable links.

2. The user controlled computer-implemented system of claim 1 wherein a 3D model of said product is identified from the group comprised of a concept rendering, technical engineering, thematic and manufacturing drawings, blueprints, promotional materials, and at least one other depicting said 3D model, each said concept rendering, drawing, blueprint, and promotional material depicting external and internal components of said product.

3. The user-controlled computer-implemented system of claim 1 wherein said target industry for said product is identified from the group comprised of technology, home goods, personal care, fitness, entertainment and at least one other.

4. The user-controlled computer-implemented system of claim 1 wherein said target audience for said product is identified from the group comprised of investors, distributors, retail customers and at least one other.

5. The user-controlled computer-implemented system of claim 1 wherein said branding theme for said product is identified from the group comprised of luxury, exclusive, inexpensive, fun and at least one other.

6. A user-controlled computer implemented system for producing improved e-commerce product videos displaying a 3D rendering of said product created from a 3D model of said product, said 3D rendering of said product having features and shots and internal and external components, the system comprising the steps of:

establishing a connection for said system locally on a computer having the requisite software, between said computer and an offsite server or cloud computer, each of said connections utilizing a web portal accessible by logging in using a personal user name and password;

identifying and selecting said 3D model of said product;

creating a file for a new or updated profile of said 3D model of said product and assigning a name to said 3D model file, said 3D model file being saved to said computer;

identifying a type of target video for said product;

identifying a target industry for said product;
identifying a target platform for said product;
identifying a branding theme for said product;
saving data to said 3D model file comprising said 3D model profile identified by said assigned name, said identified target industry, said identified target platform, and said identified branding theme;
selecting said 3D model file from among said new or updated said 3D model file profiles;
uploading said 3D model file data from said computer to said offsite server or to said cloud computer and correspondingly downloading said 3D model file data to said computer;
identifying and saving to said 3D model file said components of said product according to shared common materials and geometric and volumetric sizes and shapes wherein said shared common materials and geometric and volumetric sizes and shapes are evaluated and commonly grouped;
identifying said internal components of said product using ray traces directing light rays toward the center of said 3D model wherein said components are identified and eliminated from said 3D model, as said user elects, said identified eliminated internal components being saved to said 3D model file;
organizing said components of said 3D model by reducing the number of said components according to consolidated groupings wherein said components may be transferred into a different group, added to a new group or eliminated, said transferred, added or eliminated components being saved to said 3D model file;
manipulating said 3D model in real time using a camera to orbit said 3D model and zoom in and out for locating key points of said features and associating said components incorporating said features with definitions specific to said features, said key location points and said defined component features being saved to said computer;
providing information about said features, said information comprising individual terms identifying each of said features and onscreen text displaying facts explaining how said features and components appear, function and interrelate, wherein said information is saved to said 3D model file;
providing a catalog of music having music selections associated with keywords that identify said branding theme, said target platform and said target industry, and selecting music from said music catalog conformable to the estimated duration and pacing of said 3D product video along a timeline having predetermined edit points to switch between shots, said selected conformable music being saved to said computer;
providing a catalog of backdrops or backgrounds associated with said keywords that identify said branding theme, said target platform and said target industry;

displaying segments comprising the content of said timeline, each said segment representing at least one said shot consisting of at least one said feature of said 3D model, and each said shot being individually generated based on the position and size of said key features of said 3D model wherein a list of varied shot animations is provided for the user to view and select, each said displayed segment representative of a corresponding said shot having at least one said feature being saved to said computer; and,
creating a 3D video rendering from said 3D model according to said system of steps recited herein and delivering said 3D video rendering as downloads or embeddable links.

7. The user-controlled computer implemented system of claim 6 wherein said system is automated.

8. The user-controlled computer implemented system of claim 6 wherein said 3D model of said product is identified and selected from the group comprised of a concept rendering, a technical engineering drawing, a schematic drawing, a manufacturing drawing, a blueprint, promotional materials, and at least one other source from which to select a 3D model of said product, with all or any portion of said group, either individually or in combination, depicting said 3D model and said external and internal components of said product.

9. The user-controlled computer implemented system of claim 6 wherein said type of target video is identified from the group comprised of a 360 degree turntable video, a 30 second explainer video, a 30 second commercial, and at least one other said type of target video.

10. The user-controlled computer implemented system of claim 6 wherein said target industry for said product is identified from the group inclusive of the technology, automotive, home goods, personal care, fitness and entertainment sectors, and at least one other said target industry sector.

11. The user-controlled computer implemented system of claim 6 wherein said target platform is identified from the group inclusive of an e-commerce website, a social media website, a retail store webpage, an advertisement displayed on an internet site, and at least one other said target platform.

12. The user-controlled computer implemented system of claim 6 wherein said branding theme for said product is identified from the group inclusive of the luxury, fun, dramatic, family-friendly, and fashionable sectors, and at least one other said branding theme or sector.

13. The user-controlled computer implemented system of claim 6 wherein a said selected backdrop or background for said product is identified from the group comprised of a black stage or backing, a white stage or backing, a residential or commercial setting, a digital recreation of a location or background against or within which said product 3D model may be placed, and at least one other said backdrop or said background choice.

* * * * *